J. A. DUCASTEL.
HARNESS-SADDLE.
No. 183,655.    Patented Oct. 24, 1876.
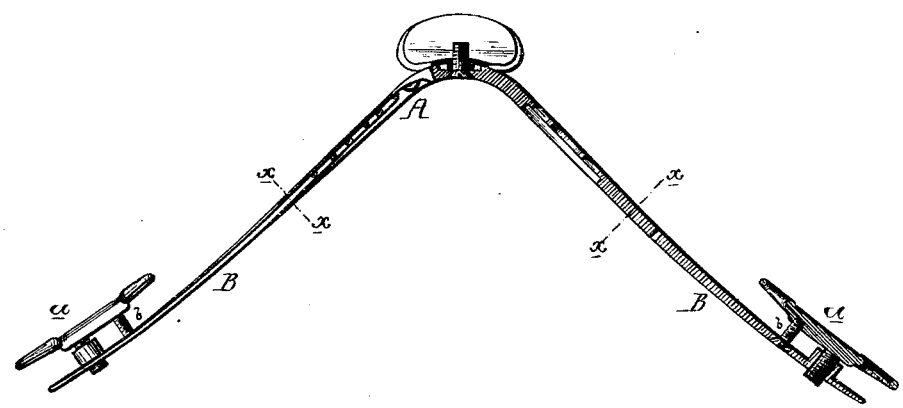

UNITED STATES PATENT OFFICE.

JOHN A. DUCASTEL, OF PHILADELPHIA, PENNSYLVANIA.

IMPROVEMENT IN HARNESS-SADDLES.

Specification forming part of Letters Patent No. 183,655, dated October 24, 1876; application filed April 22, 1876.

*To all whom it may concern:*

Be it known that I, JOHN ARSENE DUCASTEL, of Philadelphia, Pennsylvania, have invented an Improved Saddle-Tree, of which the following is a specification:

The object of my invention is to so construct a saddle-tree as to more evenly distribute the weight of the load over the back of the horse, and so as to afford a firm bearing for the hooks, to which are connected the ends of the bands, which are attached to the shafts of the vehicle.

This object I attain in the manner which I will now proceed to describe, reference being had to the figure in the accompanying drawing, which represents, partly in section and partly in elevation, my improved saddle-tree.

Saddle-trees are usually constructed of an angular frame of steel, similar to the upper portion A of my improved saddle-tree, but discontinued at or about the lines $x$ $x$.

A saddle-tree constructed in this manner does not afford a sufficient bearing upon the back of the horse, and also necessitates the attachment to loose flaps of the hooks $a$, to which are connected the upper ends of the straps which support the shafts.

These objections I overcome by the use of two arms, B B, which form part of the upper portion A of the saddle-tree, and extend downward on each side sufficiently to permit the attachment of the hooks $a$ near their lower ends.

The hooks $a$, it will be observed, are attached to the arms B by means of threaded projections adapted to studs on the arms, and to prevent the turning and twisting of the hooks, set-screws $b$, passing through the arms and projecting into the bodies, are employed.

By this means an extended bearing for the saddle-tree upon the back of the horse is provided, and the strain upon the hooks $a$, instead of being imparted to loose flaps, as usual, is restricted by the metal of the tree itself.

The inside of the tree thus constructed is smooth and free from any knobs or projections which would gall or rub the horse's back.

I claim as my invention—

1. A saddle-tree, A, provided with arms B B, which form a part of the tree, substantially as shown and described.

2. The combination of the arms B and the hooks $a$ with the set-screws $b$, as set forth.

In testimony whereof I have signed my name to this specification in the presence of two subscribing witnesses.

JOHN A. DUCASTEL.

Witnesses:
 HARRY HOWSON, Jr.,
 HARRY SMITH.